US007314000B2

(12) United States Patent
Houel

(10) Patent No.: US 7,314,000 B2
(45) Date of Patent: Jan. 1, 2008

(54) TOASTER WITH REMOVABLE BASE

(75) Inventor: Jean-Pierre Houel, Saint Ame (FR)

(73) Assignee: SEB S.A., Ecully (FR)

( * ) Notice: Subject to any disclaimer, the term of this patent is extended or adjusted under 35 U.S.C. 154(b) by 35 days.

(21) Appl. No.: 10/780,733

(22) Filed: Feb. 19, 2004

(65) Prior Publication Data

US 2004/0226453 A1 Nov. 18, 2004

(30) Foreign Application Priority Data

Feb. 19, 2003 (FR) .................................. 03 02043

(51) Int. Cl.
*A47J 37/08* (2006.01)
(52) U.S. Cl. .................... 99/327; 99/327 P; 99/331; 99/385; 99/389; 99/391
(58) Field of Classification Search .......... 99/326–333, 99/337, 338, 385–393; 219/392, 412–414, 219/514, 518, 521, 385, 386, 494, 497, 509, 219/491, 493
See application file for complete search history.

(56) References Cited

U.S. PATENT DOCUMENTS

| | | | |
|---|---|---|---|
| 3,483,814 A | | 12/1969 | Schwartz et al. |
| 3,669,004 A | * | 6/1972 | Eaton et al. ................... 99/331 |
| 3,800,691 A | * | 4/1974 | Eaton et al. ................... 99/391 |
| 4,986,173 A | | 1/1991 | Hahnewald et al. |
| 5,072,662 A | * | 12/1991 | Yip .............................. 99/327 |
| 5,095,814 A | * | 3/1992 | Ott et al. ...................... 99/391 |
| 5,598,765 A | * | 2/1997 | Yip .............................. 99/327 |
| 5,771,780 A | * | 6/1998 | Basora et al. ................. 99/327 |
| 6,244,166 B1 | * | 6/2001 | Lebron .......................... 99/342 |
| 6,250,212 B1 | * | 6/2001 | Yeung et al. .................. 99/391 |
| 6,481,341 B1 | * | 11/2002 | Choi ............................. 99/327 |
| 6,595,111 B1 | * | 7/2003 | Chiu et al. .................... 99/327 |

FOREIGN PATENT DOCUMENTS

| | | |
|---|---|---|
| CH | 236 003 | 1/1945 |
| CH | 401 288 | 10/1965 |
| DE | 1 272 471 | 7/1968 |
| DE | 2 025 525 | 12/1971 |

\* cited by examiner

*Primary Examiner*—Timothy F. Simone
(74) *Attorney, Agent, or Firm*—Browdy and Neimark, PLLC

(57) ABSTRACT

A toaster composed of a case having lateral walls that constitute the outer cover of the toaster, the case containing a frame forming a toasting chamber having an opening at an upper part of the case and an opening at a lower part of the case, a base removably connectable to the case and facing the opening at the lower part of the case, and a heating unit for the chamber having heating elements situated in proximity to the chamber and connected to a device for supplying electric power and for controlling the heating elements. The base is completely removable from the case, and the base and the case have respective elements that interact with one another when the case is disposed on the base, such that withdrawal of the case from the base suppresses the interaction to prevent the supply of electric power to the heating elements.

18 Claims, 5 Drawing Sheets

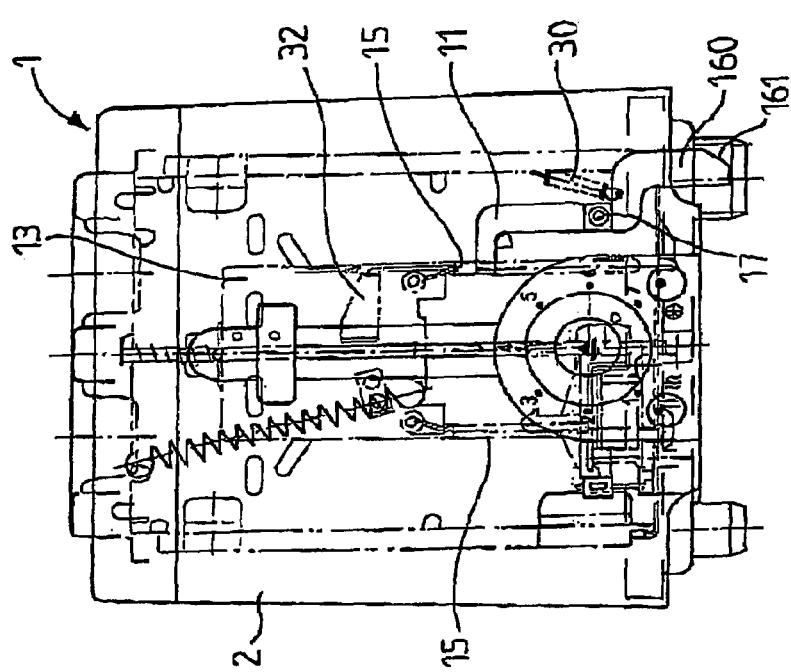
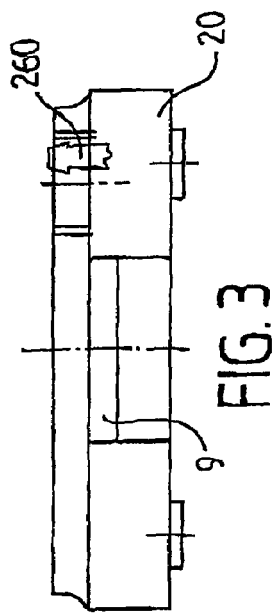
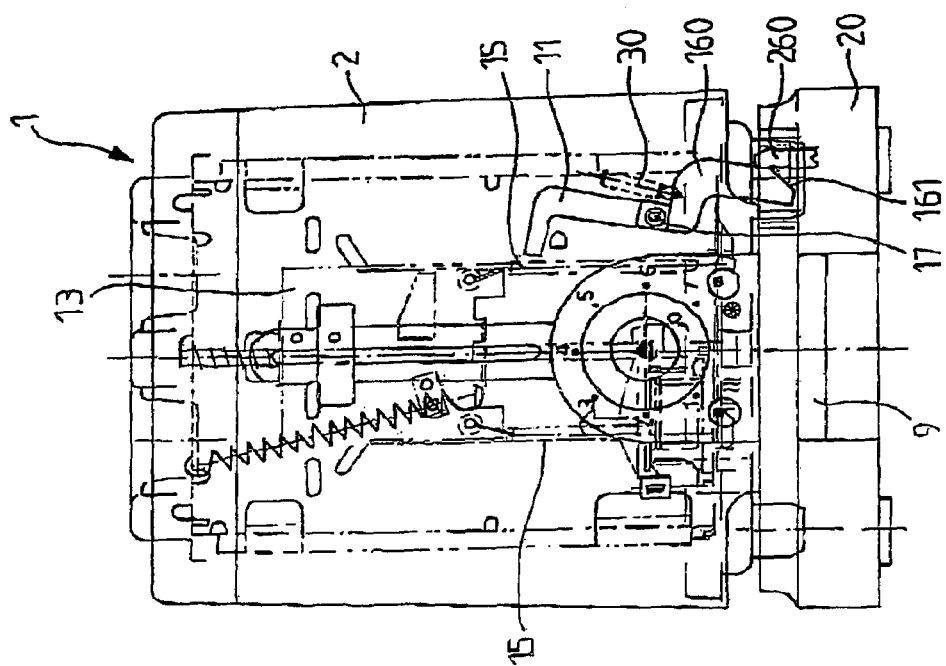
FIG. 2
FIG. 3

TOASTER WITH REMOVABLE BASE

BRIEF SUMMARY OF THE INVENTION

The present invention provides a toaster that remedies, or at least minimizes, these problems. This toaster includes a case having in particular lateral walls that form the outer cover of the toaster, a base in connection with the case, the case containing a frame forming a vertically open toasting chamber, on the one hand in the upper part of the case and on the other hand on the lower part of the case, in the direction of the base, the chamber being provided with heating means situated in proximity to the toasting chamber and connected to a device for supplying electric power and for controlling the heating elements, the base being removable from the case. According to the invention, the base and the case have a safety arrangement composed of elements that interact with one another when the case is disposed on the base, suppression of this interaction by the withdrawal of the case from the base preventing the supply of electric power to the heating elements.

Thus, by providing a removable base for the toaster case, it becomes easier to gain access to not only crumbs that fall into the toasting chamber but equally to residues that remain attached to the various walls around the toasting chamber. This is even more useful when the removability of the base permits access, through the bottom of the case, to the lower part of the toasting chamber, which is difficult to reach in this specific toaster architecture, permitting a more complete cleaning of the toaster.

One valuable contribution of the invention is that it integrates mechanical and electrical safety in that separation of the base from the case makes it impossible to supply power to the heating elements. In effect, by facilitating access to the toasting chamber, it is desirable to provide one or several safety measures to prevent operation of the toaster when the case is not positioned on the base.

In addition, since the base serves to provide thermal insulation for the toaster, operation of the toaster without the base could cause the surface on which the toaster is placed to be heated to dangerously high temperatures that could lead, for example, to deterioration or damage to that surface.

Certain embodiments of the base according to the invention can be cleaned in a dishwasher.

Advantageously, the base has a hollow zone for collecting crumbs, this zone being located directly beneath the toasting chamber when the case is mounted on the base.

According to one form of construction of this safety arrangement, the element disposed in the case can occupy two positions depending on whether the case is disposed or not on the base. One of these positions is located in the path of travel of the bread rack or of a piece that is movable with the bread rack, while preventing this latter from reaching the lower part of the toaster when the case is not properly connected to the base.

This form of construction permits the bread rack to be physically prevented from reaching the lowered position where it would trigger a toasting cycle by switching on the heating element supply. When the rack, or its control element, cannot reach this position, it becomes impossible to supply power to the heating elements.

According to another embodiment of the safety arrangement, the element disposed in the base is a finger and the element disposed in the case is an electric switch in the electric circuit for supplying current to the heating elements. This arrangement permits direct action on the electric supply circuit for the heating elements, which permits a wide adaptation of this device to different toaster models, independently of the internal arrangement of the different elements, and particularly of the bread rack.

Advantageously, the switch is present in the form of a contact that opens the supply circuit for the heating elements when the base is separated from the case. This offers a supplemental safety measure by immediately halting the electric supply of the heating elements when the case is separated from the base.

The two forms of construction described above are associated primarily with embodiments where the base does not have any electric element for supplying the heating elements. For these forms of construction, electric supply of the heating elements is furnished by an electric cord connected to the heating elements and associated with the case.

According to other forms of construction, the base has an electric connector connected to a plug for connection: to electric power means, the connector being of the male or female type and cooperating, when the case is disposed on the base, with a complementary part disposed on the frame or the case of the toaster and electrically connected to the heating elements.

Advantageously, the circuit for supplying power to the heating elements has an electric trigger locking the case to the base when the heating elements are being supplied with power. This arrangement, which can be used to provide additional security, assures that any disconnection of the base from the case is prevented when the heating elements are being supplied with power.

BRIEF DESCRIPTION OF THE DRAWINGS

FIG. 2 is an elevational end view of a first form of construction of the first embodiment with internal parts being shown and the case being attached to the base.

FIG. 3 is view similar to that of FIG. 2, but with the base separated from the base.

DETAILED DESCRIPTION OF THE INVENTION

Figure 1:
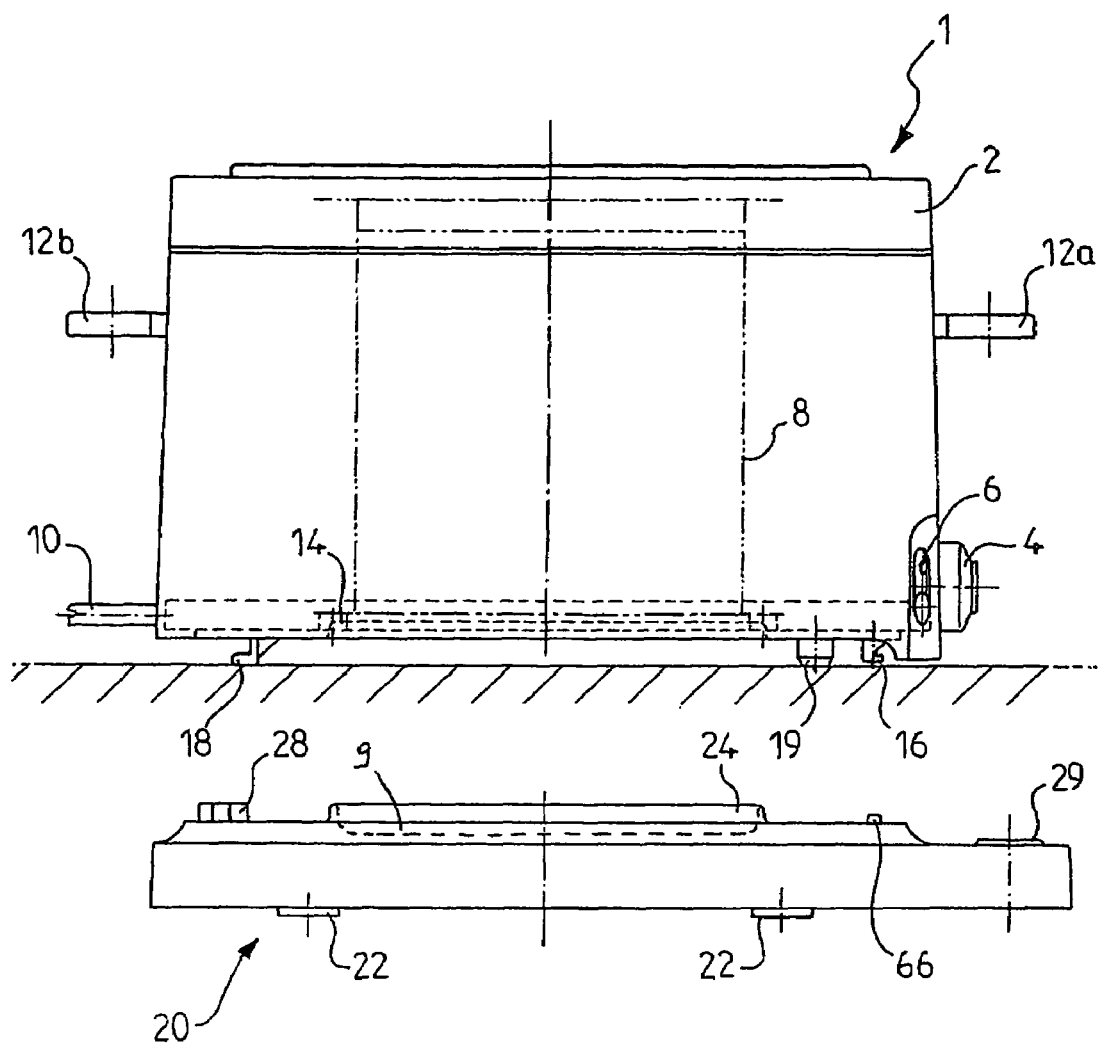
FIG. 1 is a side elevational view of a first possible embodiment of the invention, with the base being separated from the case.

Referring to FIG. 1, a toaster 1 according to a first embodiment of the invention has a case 2 at the interior of which is arranged a frame defining, in particular, a toasting chamber 8. Heating elements (not shown) are associated with this chamber in a conventional manner. The chamber has an opening at its bottom that extends over substantially the entire surface area of the chamber.

Case 2 also has gripping handles 12*a*,12*b* on its lateral walls, handle 12*a* also serving as a control element for lowering the bread rack into the toasting position. The bread rack can be of a conventional type and is not shown in FIG. 1. The toaster also has a control button 4 that is movable to adjust the degree of toasting desired, as well as controls 6 for special functions, such as immediate ejection of bread, defrosting, etc., all as known in the art.

According to a first configuration, case 2 contains the entire electric circuit for supplying power to the heating elements, including a power cord 10 for connection to the power mains.

According to the invention, toaster 1 further includes a base 20 that is completely removable from case 2.

According to the example shown, base 20 has a slightly protruding part 24 associated with a complementary opening 14 in case 2. Part 24 and opening 14 cooperate to guide case 2 into the correct position on base 20 when the two components are to be assembled together. Base 20 is also partially recessed at its side that faces the toasting chamber in order to present a zone for collecting crumbs.

Base 20 also advantageously has four feet 22, and case 2 could equally be provided with feet 18 and 19 that permit case 2 to rest on the work surface when base 20 has been removed for cleaning.

Advantageously, a mechanical latching or locking system permits case 2 to be secured to base 20 in a removable manner. For example, case 2 can be provided with a hook 16 that extends from the frame in proximity to one end of case 2, which, for the sake of description, will be referred to herein as the "rear" part. Hook 16 can cooperate with any suitable retaining element installed in base 20 in order to maintain case 2 securely connected to base 20, as will be discussed in greater detail below.

In order to maintain the "front" part of case 2 in position on base 20, a further attachment element, which could be constituted by foot 18, has a horizontal flange that can cooperate with a suitable retaining means 28 secured to base 20 and having a notch, or recess, for receiving the flange on foot 18.

Thus, when the user wishes to lock case 2 on base 20, it is only necessary to incline case 2 toward the front in a manner to insert the flange of foot 18 into the notch of means 28. Then it is only necessary to pivot case 2 in a manner to lower the rear part of the toaster until hook 16 comes to lock on its associated retaining means in base 20.

An unlocking button 29, which can be provided on base 20 or on case 2, permits hook 16 to be released from the retaining means, thus permitting the user to separate case 2 from base 20 by a movement opposite to the closing movement described above.

A first specific form of construction of the first embodiment of the invention is shown in FIGS. 2 and 3. Here, toaster 1 has a mechanical safety device preventing electric power from being supplied to the heating elements when base 20 is separated from case 2. Here, the bread rack is connected, at least at one of its ends, to a driver 13 that can slide vertically while being guided in grooves 15.

A part 160, connected to the frame of the toaster, is pivotable about an axis 17 against the restoring force of a spring 30, and has an extension arm 11 above this axis. Base 20 has a contact, or pin 260, that interacts with part 160. When part 160 does not interact with pin 260, the action of spring 30 maintains arm 11 in the position shown in FIG. 3 where arm 11 is situated in the path of travel of driver 13, thus preventing driver 13 and the associated bread rack from reaching the lowered, toasting position. Now, in this particular form of construction of the toaster, closing of the electric supply circuit for the heating elements is achieved by driver 13, when it is in its lowered position. At this time, a projecting part 32 of driver 13 closes a switch disposed in the electric supply circuit for the heating elements.

When case 2 is positioned on base 20, the cooperation between part 160 and pin 260, facilitated by a ramp 161 provided on part 160, permits arm 11 to pivot about axis 16. As a result, arm 11 moves away from the path of travel of driver 13, permitting the latter to then slide downwardly to its lowered, toasting position and permitting the supply of current to the heating elements to be initiated.

Figure 4:
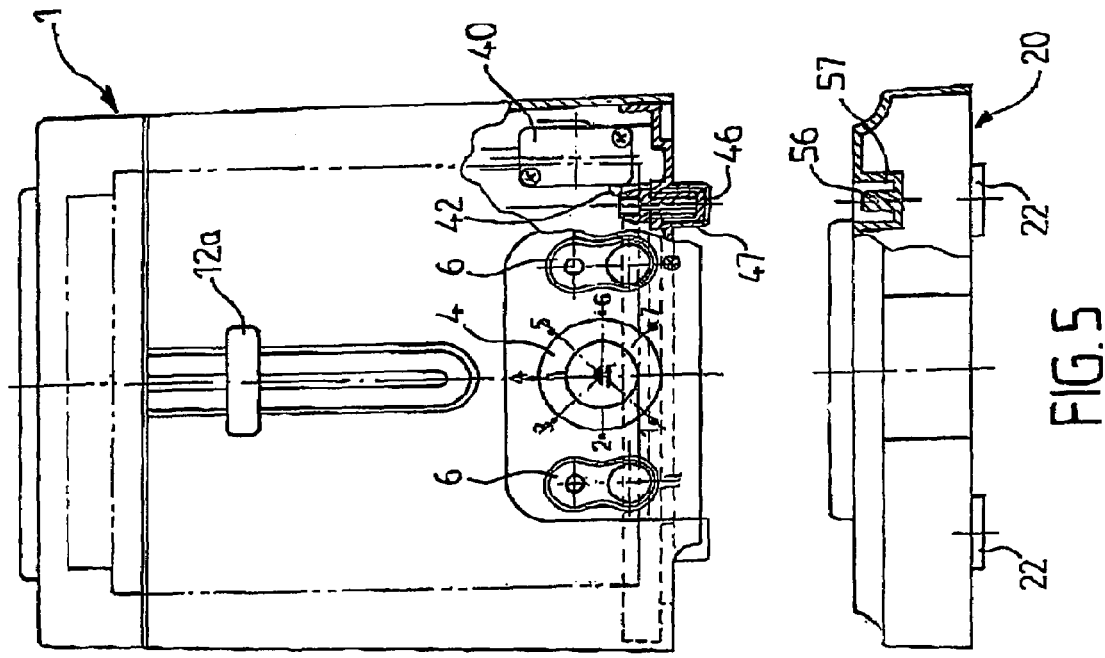
FIGS. 4 and 5 are views similar to those of FIGS. 2 and 3 respectively of a second form of construction of the first embodiment.
Figure 5:
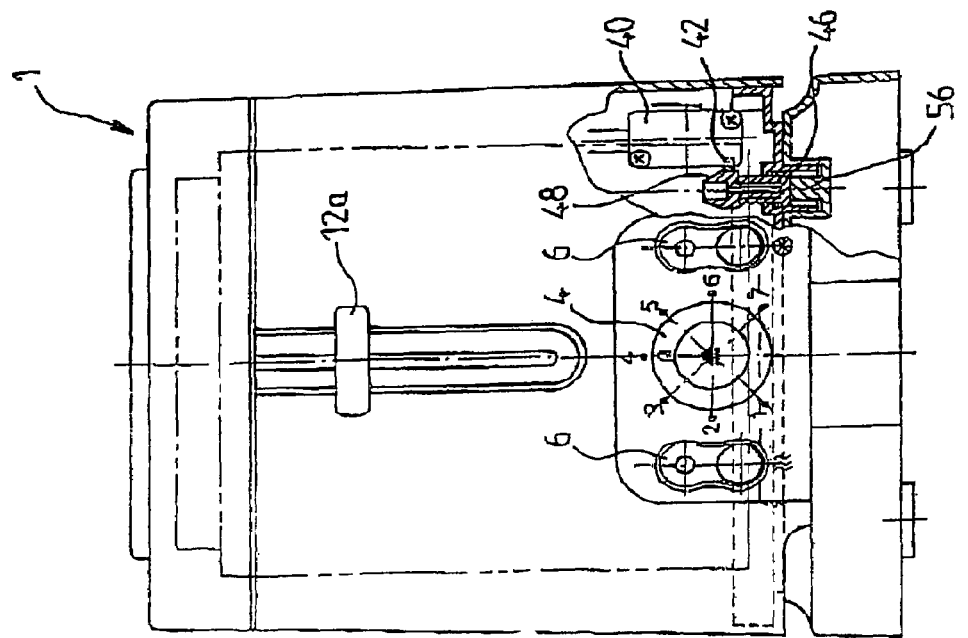

In a second form of construction shown in FIGS. 4 and 5, the safety device is an electric switch 40 connected to the case or its associated frame and having a contactor 42. A piece 46 movable in a housing 47, extending from the case or its frame, is positioned in the immediate vicinity of contactor 42. Piece 46 is movable vertically and has a conical tip 48 disposed to interact with contactor 42 when piece 46 is displaced upwardly. Advantageously, housing 47 can be one of the feet of the case, corresponding to foot 19 shown in FIG. 1, and provides support for the case when it has been separated from base 20.

In addition, base 20 has a housing 57 within which is positioned an upwardly projecting finger, or pin 56. Housing 57 is positioned to receive housing 47 of piece 46, whereupon finger 56 will effect a relative vertical upward displacement of piece 46.

When the case is installed on the base, finger 56 pushes piece 46 upwardly. This causes tip 48 to interact with contactor 42 of switch 40 in a manner to enable power to be supplied to the heating elements when a toasting cycle is initiated, for example by the lowering of the bread rack to its lower toasting position. Upon removal of the case from the base, piece 46 returns, under the influence of gravity or with the aid of a restoring spring, to its original, lowered position. In that position, tip 48 no longer interacts with contactor 42, thereby opening switch 40 and deactivating the circuit for supplying power to the heating elements.

FIG. 6 show details of a form of construction of the first embodiment of the invention.

As shown in these figures, base 20 has a control button 29 that is mounted to be vertically movable against the restoring force of a spring 94. Button 29 preferably has a projecting part 92 that is directed downwardly. One of the edges of projecting part 92 is beveled.

Base 20 also has at least one part 73 that is mounted to slide horizontally against the restoring force of a return spring 76. At one of its ends, part 73 has a lug 74. At its other end, part 73 has a flat horizontal extension piece 78 provided with a vertical opening 80. Advantageously, there are two parts 73 in base 20, with a common horizontal extension piece, transversely connecting the two parts 73, as can be understood from a consideration of FIG. 6c. The two parts 73 are disposed in a symmetrical manner with respect to control button 29, as is also apparent from FIG. 6c.

Independently of the latching, or locking, system, the base has a button 66. Button 66 is vertically movable, in a housing 68 that delimits a volume 75, in opposition to the restoring force of a return spring 70. Button 66 is disposed between the two lugs 74 such that wall 69 of housing 68 extends at least up to lugs 74, permitting lugs 74 to be able to slide into volume 75.

In addition, button 66 can slide through an opening 72 formed in the upper face of the base.

The components shown in FIGS. 6a-6c operate in the following manner. When the case is secured on the base, push button 66 is depressed under the weight of the case, against the restoring force of spring 70, and the positions of all of the elements are as shown in FIG. 6b.

Spring 76 is freely movable in the horizontal direction in a manner such that interaction of hook 16 with lug or lugs 74 causes an initial compression of spring 76, followed by an expansion of spring 76 as lug or lugs 74 move the latch into the recess, or notch, of hook 16.

Figure 6A:
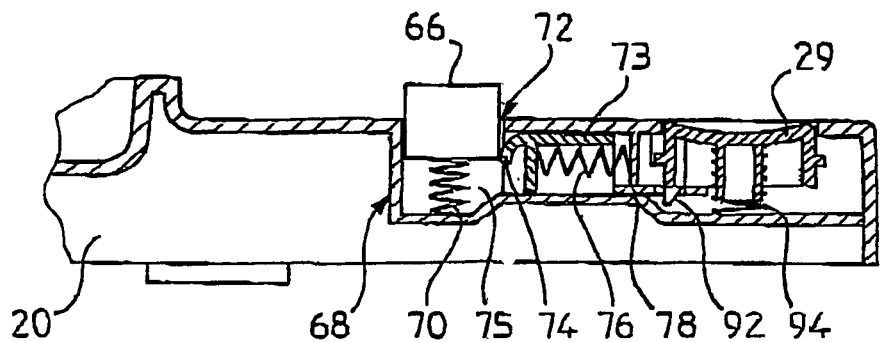
FIGS. 6*a* and 6*b* are cross-sectional views along the axis A-A' of FIG. 6*c*, showing details of construction of the first embodiment of the invention.
Figure 6B:
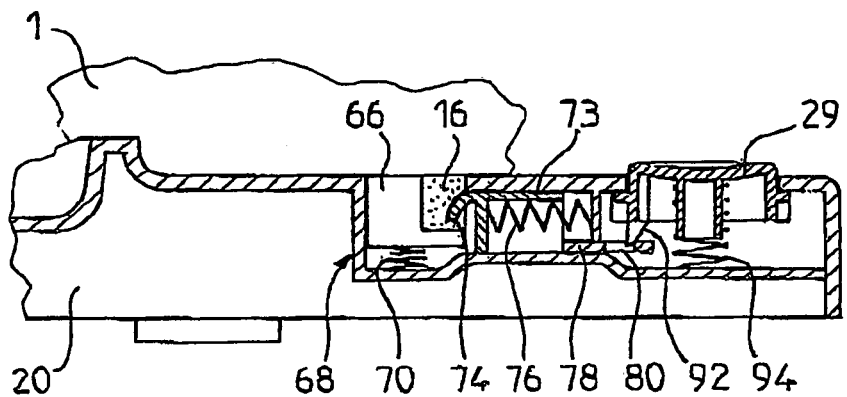
Figure 6C:
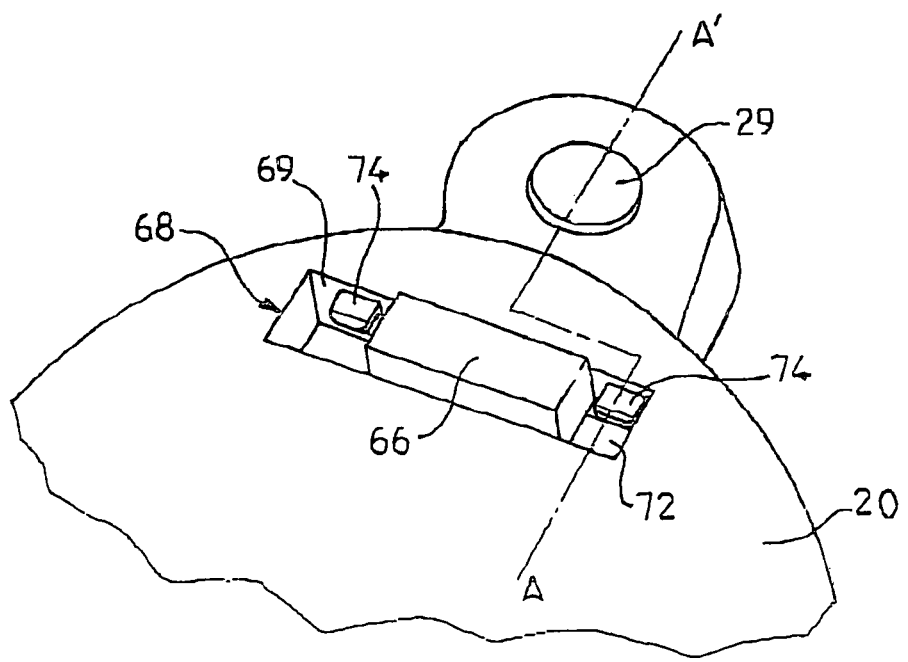
FIG. 6*c* is a perspective detail view of the construction shown in FIGS. 6*a* and 6*b*.

When the user wishes to unlatch the case from the base, he presses vertically on button 29, to place it in the position shown in FIG. 6a. Projecting part 92 interacts then with the edge of opening 80 of extension 76, compressing spring 76, until the engagement between lug or lugs 74 and hook 16 is terminated. This provokes a release of spring 70, which aids the separation of the case from the base.

Figure 7:
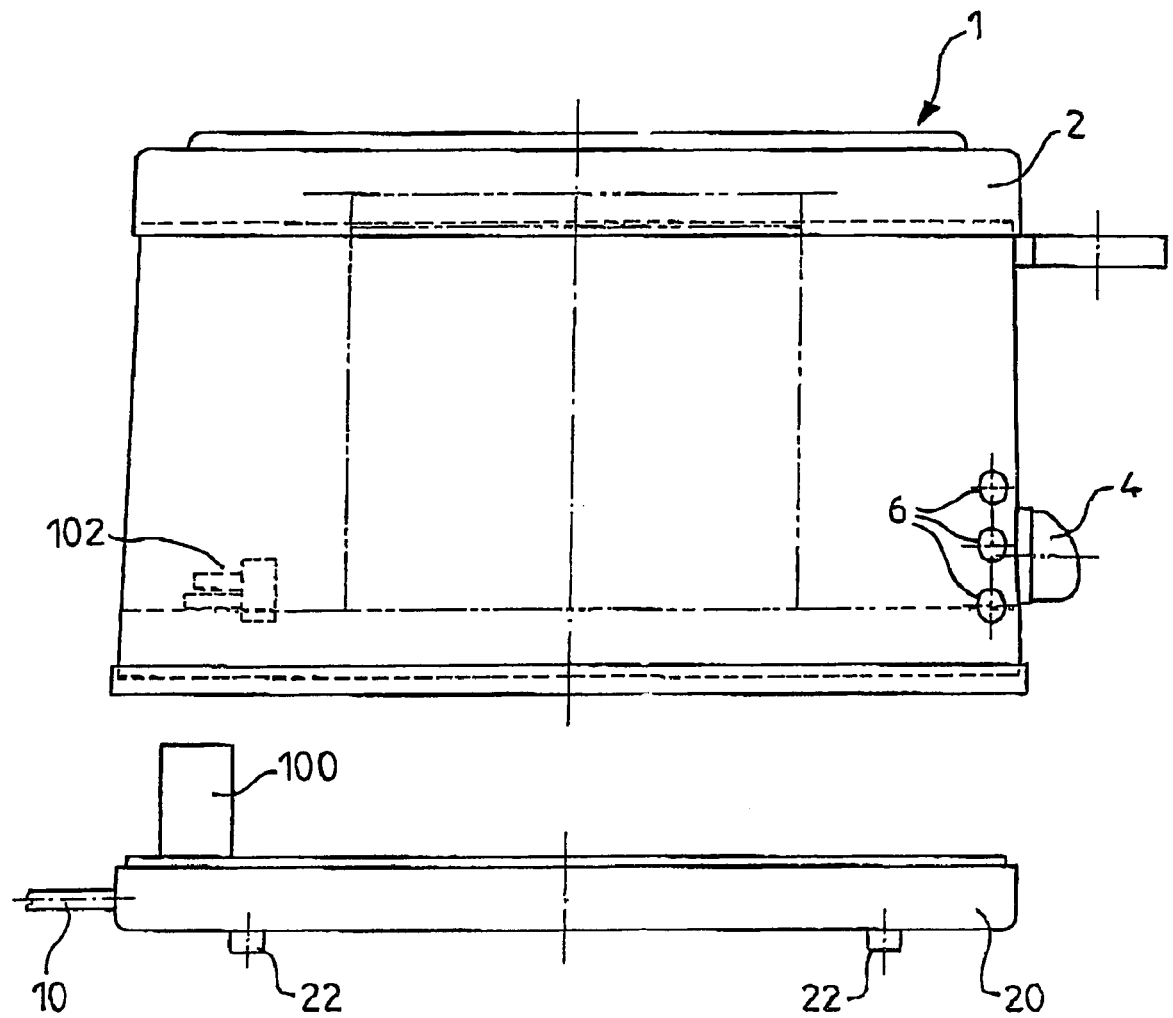
FIG. 7 is a view similar to that of FIG. 1 of a second possible embodiment of the invention.

A second possible embodiment of the invention is shown in FIG. 7, where base 20 carries the components for supplying electric power to the heating elements. In particular, power cord 10 is installed in base 20 and the wires of cord 10 are connected to pins, or plugs, contained in a connector 100. Case 2 contains a complementary connector 102 connected to the circuit for supplying electric current to the heating elements. Such complementary connectors are commonly used, for example, in kitchen water heating appliances of the boiler type and include the security measures necessary to prevent all access to the parts to which a voltage may be applied. In other words, the connection between connectors 100 and 102 may be established in ways known in the art to facilitate connection and disconnection of case 2 and base 20.

This application relates to subject matter disclosed in French Application number FR 03 02043, filed on Feb. 19, 2003, the disclosure of which is incorporated herein by reference.

While the description above refers to particular embodiments of the present invention, it will be understood that many modifications may be made without departing from the spirit thereof. The accompanying claims are intended to cover such modifications as would fall within the true scope and spirit of the present invention.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

What is claimed is:

1. A toaster comprising: a case having lateral walls that constitute the outer cover of said toaster, said case containing a frame forming a toasting chamber having an opening at an upper part of said case and an opening at a lower part of said case; a base supporting said case, removably connectable to said case, and facing the opening at the lower part of said case; and heating means for said chamber having heating elements situated in proximity to said chamber and connected to a device that includes an electric circuit for supplying electric power and for controlling said heating elements, wherein said base is completely removable from said case, and said base and said case have respective elements that interact with one another when said case is disposed on said base, such that withdrawal of said case from said base suppresses the interaction to prevent the supply of electric power to said heating elements.

2. The toaster of claim 1, wherein said base has a hollow zone for collecting crumbs, said zone being located directly beneath said toasting chamber when said case is mounted on said base.

3. The toaster of claim 1, further comprising a vertically movable bread rack for supporting bread in said toasting chamber, and wherein said element in said case can occupy two positions depending on whether said case is disposed or not on said base, one of said positions being located in the path of travel of said bread rack or of a piece that is movable with said bread rack, while preventing said bread rack or said piece from reaching the lower part of said toaster when said case is not properly connected to said base.

4. The toaster of claim 1, wherein said element in said base is a finger and said element in said case is an electric switch in said electric circuit for supplying current to said heating elements.

5. The toaster of claim 4, wherein said switch comprise a contact that opens said circuit for supplying current for said heating elements when said base is separated from said case.

6. The toaster of claim 5, wherein said base has an electric connector connected to a plug for connection to electric power means, said connector cooperating, when said case is disposed on said base, with a complementary part that is disposed on said frame or said case of said toaster and that is electrically connected to said heating elements.

7. The toaster of claim 6, wherein said circuit for supplying power to said heating elements has an electric trigger locking said case to said base when said heating elements are being supplied with power.

8. The toaster of claim 1, wherein said base has an electric connector connected to a plug for connection to electric power means, said connector cooperating, when said case is disposed on said base, with a complementary part that is disposed on said frame or said case of said toaster and that is electrically connected to said heating elements.

9. The toaster of claim 1, wherein said circuit for supplying power to said heating elements has an electric trigger locking said case to said base when said heating elements are being supplied with power.

10. The toaster of claim 1, wherein said case rests on said base when said base is connected to said case.

11. The toaster of claim 10, wherein said case and said base are constructed to allow said base to be connected to said case by a pivoting movement of said case relative to said base.

12. The toaster of claim 1, wherein said case has a plurality of feet that permit said case to rest on a work surface when said base has been removed for cleaning.

13. The toaster of claim 1, wherein said case is constructed for permitting access, through the opening at said lower part of said case, to a lower part of said toasting chamber when said base is removed from said case.

14. The toaster of claim 1, wherein said base is constructed for supporting said toaster on a surface and for providing thermal insulation for said toaster when said case is supported by said base.

15. The toaster of claim 1, wherein said case and said base are constructed to allow said base to be connected to said case by only a pivoting movement of said case relative to said base.

16. The toaster of claim 1, further comprising means for latching or locking said case to said base in a removable manner, said means including an unlocking button that is operable to permit said case to be removed from said base.

17. A toaster comprising: a case having lateral walls that constitute the outer cover of said toaster, said case containing a frame forming a toasting chamber having an opening at an upper part of said case and an opening at a lower part of said case; a base supporting said case, removably connectable to said case, and facing the opening at the lower part of said case, said base having a plurality of feet; and heating means for said chamber having heating elements situated in proximity to said chamber and connected to a device that includes an electric circuit for supplying electric power and for controlling said heating elements, wherein said base is completely removable from said case, and said base and said case have respective elements that interact with one another when said case is disposed on said base, such that withdrawal of said case from said base suppresses the interaction to prevent the supply of electric power to said heating elements.

18. The toaster of claim 17, wherein said case has a plurality of feet that permit said case to rest on a work surface when said base has been removed for cleaning.

* * * * *